United States Patent
Wildhaber et al.

(10) Patent No.: US 11,888,429 B2
(45) Date of Patent: Jan. 30, 2024

(54) ACTUATOR WITH AN ELECTRIC MOTOR AND A METHOD OF CONTROLLING THE ELECTRIC MOTOR TO MAINTAIN A CURRENT POSITION

(71) Applicant: BELIMO HOLDING AG, Hinwil (CH)

(72) Inventors: Stefan Wildhaber, Neuhaus (CH); Balazs Schweighoffer, Uster (CH)

(73) Assignee: BELIMO HOLDING AG, Hinwil (CH)

(*) Notice: Subject to any disclaimer, the term of this patent is extended or adjusted under 35 U.S.C. 154(b) by 472 days.

(21) Appl. No.: 17/263,950

(22) PCT Filed: Sep. 5, 2019

(86) PCT No.: PCT/EP2019/073652
§ 371 (c)(1),
(2) Date: Jan. 28, 2021

(87) PCT Pub. No.: WO2020/049079
PCT Pub. Date: Mar. 12, 2020

(65) Prior Publication Data
US 2021/0313911 A1    Oct. 7, 2021

(30) Foreign Application Priority Data
Sep. 7, 2018   (CH) .................... 01063/18

(51) Int. Cl.
*H02P 6/10*   (2006.01)
*F24F 11/88*  (2018.01)

(52) U.S. Cl.
CPC ............. *H02P 6/10* (2013.01); *F24F 11/88* (2018.01)

(58) Field of Classification Search
CPC ............. H02P 6/10; H02P 3/025; F24F 11/88
USPC ............................. 318/400.23, 400.01, 700
See application file for complete search history.

(56) References Cited

U.S. PATENT DOCUMENTS

| | | | | |
|---|---|---|---|---|
| 8,587,233 B2* | 11/2013 | Bass | .................... | H02P 6/28 318/400.11 |
| 9,559,623 B2* | 1/2017 | Mullin | .................... | H02P 6/181 |

FOREIGN PATENT DOCUMENTS

| | | |
|---|---|---|
| DE | 19843123 A1 | 4/2000 |
| DE | 10062025 C1 | 7/2002 |
| EP | 2020073 A1 | 2/2009 |
| EP | 2491640     | 8/2012 |

OTHER PUBLICATIONS

International Search Report of PCT/EP2019/073652 dated Nov. 13, 2019 [PCT/ISA/210].
Swiss Search Report of CH01063/18 dated Dec. 4, 2018.

* cited by examiner

*Primary Examiner* — David Luo
(74) *Attorney, Agent, or Firm* — Sughrue Mion, PLLC

(57) ABSTRACT

For controlling an electric motor to maintain a current motor position, a motor controller determines the current motor position of the electric motor and selects (S41) from a set of stable positions, defined by cogging torque of the electric motor, a selected stable position closest to the current motor position. The controller controls the motor torque of the electric motor to maintain the motor position (S4) within a defined range around the selected stable position.

16 Claims, 3 Drawing Sheets

ACTUATOR WITH AN ELECTRIC MOTOR AND A METHOD OF CONTROLLING THE ELECTRIC MOTOR TO MAINTAIN A CURRENT POSITION

CROSS REFERENCE TO RELATED APPLICATIONS

This application is a National Stage of International Application No. PCT/EP2019/073652 filed on Sep. 5, 2019, claiming priority based on Swiss Patent Application No. 01063/18 filed on Sep. 7, 2018, the entire contents of each of which are herein incorporated by reference in their entireties.

FIELD OF THE INVENTION

The present invention relates to an actuator with an electric motor and a method of controlling the electric motor to maintain a current position. Specifically, the present invention relates to an actuator comprising an electric motor having cogging torque, and a controller configured to control operation of the electric motor and determine a motor position of the electric motor, and to a method of controlling the electric motor to drive an actuated part of a Heating, Ventilating, and Air Conditioning (HVAC) system to a target position and maintain a current motor position.

BACKGROUND OF THE INVENTION

Actuators, which comprise an electric motor in connection with a controller for controlling operation of the electric motor, are used in many areas of application where parts need to be actuated by the electric motor in a controlled fashion. Particularly, in applications where mechanical parts need to be actuated into defined positions and/or orientations, actuators are equipped with controllers that are configured to determine the current motor position of the electric motor and to control operation of the electric motor, such as to move the electric motor or the actuated part, respectively, to a set target position and/or orientation. Examples of application include actuating and positioning dampers or shutters of fluid ducts or ports, regulating members of valves, e.g. balls in ball valves or discs in disc valves, or the like. In scenarios and situations where there is dynamically changing external influences and forces affecting the actuated parts, e.g. wind on the shutter of an air intake port, varying pressure in a fluid transportation system, etc., the current position of the electric motor or the actuated part, respectively, must be monitored continuously and readjusted, if necessary, in order to maintain a set target position. Maintaining the target position of the electric motor or the actuated part, respectively, in the presence of external forces and influences on the actuated parts may require significant amounts of electric energy. For the actual operation of the electric motor an inherent cogging torque is a further undesirable influential factor. Cogging torque of electrical motors is produced as a result of the interaction between permanent magnets of the rotor and the stator slots. The cogging torque is especially prominent at lower speeds and can be observed as stuttering or jerky movement.

EP 2491640 describes a brushless direct current motor with cogging torque.

In the field of couplings for transmitting rotation, clutches and brakes, DE 19843123 describes an electric brake for motor vehicles. The electric brake of DE 19843123 has a blocking brake function produced by pronounced stator and rotor poles and applying defined blocking current to bring poles into latching position.

SUMMARY OF THE INVENTION

It is an object of this invention to provide an actuator with an electric motor and a method of controlling the electric motor to drive an actuated part of an HVAC system to a target position and maintain a current position. In particular, it is an object of the present invention to provide an actuator with an electric motor having cogging torque, and a method of controlling the electric motor to drive an actuated part of an HVAC system to a target position and maintain a current motor position, whereby at least some electric energy required for maintaining a target position can be reduced.

According to the present invention, the above-mentioned objects are particularly achieved in that in an actuator, which comprises an electric motor having cogging torque and a controller configured to control operation of the electric motor and determine a motor position of the electric motor, the controller comprises a circuit configured to control the electric motor to drive an actuated part of an HVAC system to a target position and maintain a current motor position by determining from a set of stable positions defined by the cogging torque a selected stable position closest to the current motor position, and controlling a motor torque of the electric motor to maintain the motor position within a defined range around the selected stable position. For example, the electric motor is a brushless direct current motor.

In an embodiment, the circuit is configured to reduce the motor torque as long as the current motor position is within the defined range around the selected stable position.

In a further embodiment the circuit is configured to keep the motor torque at zero when the motor torque has been reduced to zero and the current motor position is within the defined range around the selected stable position.

In an embodiment, the circuit is configured to increase the motor torque to return the motor position within the defined range around the selected stable position when the current motor position has moved outside the defined range around the selected stable position.

In a further embodiment, the circuit is configured to record a value of the motor torque when the current motor position has reached a boundary of the defined range around the selected stable position, to increase the motor torque to return the motor position within the defined range around the selected stable position, and to reduce the motor torque as long as the current motor position is within the defined range around the selected stable position, using the recorded value of the motor torque for determining a limit of reducing the motor torque.

In an embodiment, the circuit is configured to determine the set of stable positions by controlling the electric motor to move in incremental steps, determining the motor torque to maintain the motor position at the incremental steps, and determining the set of stable positions from the incremental steps requiring the smallest motor torque to maintain the motor position.

In a further embodiment, the actuator further comprises an electrical energy store configured to drive the electric motor to a defined safety position in case of a power failure.

In addition to the actuator, the present invention also relates to a damper for an HVAC system comprising a damper blade and the actuator coupled to the damper blade for moving the damper blade.

In addition to the actuator and the HVAC damper, the present invention also relates to a method of controlling an electric motor to drive an actuated part of an HVAC system to a target position and maintain a current motor position. The method comprises a controller determining the current motor position of the electric motor, the controller determining from a set of stable positions, defined by cogging torque of the electric motor, a selected stable position closest to the current motor position, and the controller controlling a motor torque of the electric motor to maintain the motor position within a defined range around the selected stable position.

In an embodiment, the controller reduces the motor torque as long as the current motor position is within the defined range around the selected stable position.

In a further embodiment, the controller keeps the motor torque at zero when and if the motor torque has been reduced to zero and the current motor position is within the defined range around the selected stable position.

In an embodiment, the controller increases the motor torque to return the motor position within the defined range around the selected stable position when and if the current motor position has moved outside the defined range around the selected stable position.

In a further embodiment, the controller records a value of the motor torque when the current motor position has reached a boundary of the defined range around the selected stable position, the controller increases the motor torque to return the motor position within the defined range around the selected stable position, and the controller reduces the motor torque as long as the current motor position is within the defined range around the selected stable position, using the recorded value of the motor torque for determining a limit of reducing the motor torque.

In an embodiment, the controller determines the set of stable positions by controlling the electric motor to move in incremental steps, determining the motor torque to maintain the motor position at the incremental steps, and determining the set of stable positions from the incremental steps requiring the smallest motor torque to maintain the motor position.

In addition to the actuator, the HVAC damper, and the method of controlling the electric motor, the present invention also relates to a computer program product, particularly, to a computer program product comprising a non-transient computer readable medium. The computer program product or the non-transient computer readable medium, respectively, has stored thereon computer program code configured to control a processor of an actuator such that the processor controls an electric motor of the actuator to drive an actuated part of an HVAC system to a target position and maintain a current motor position, by determining the current motor position of the electric motor, determining from a set of stable positions, defined by cogging torque of the electric motor, a selected stable position closest to the current motor position, and controlling a motor torque of the electric motor to maintain the motor position within a defined range around the selected stable position.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
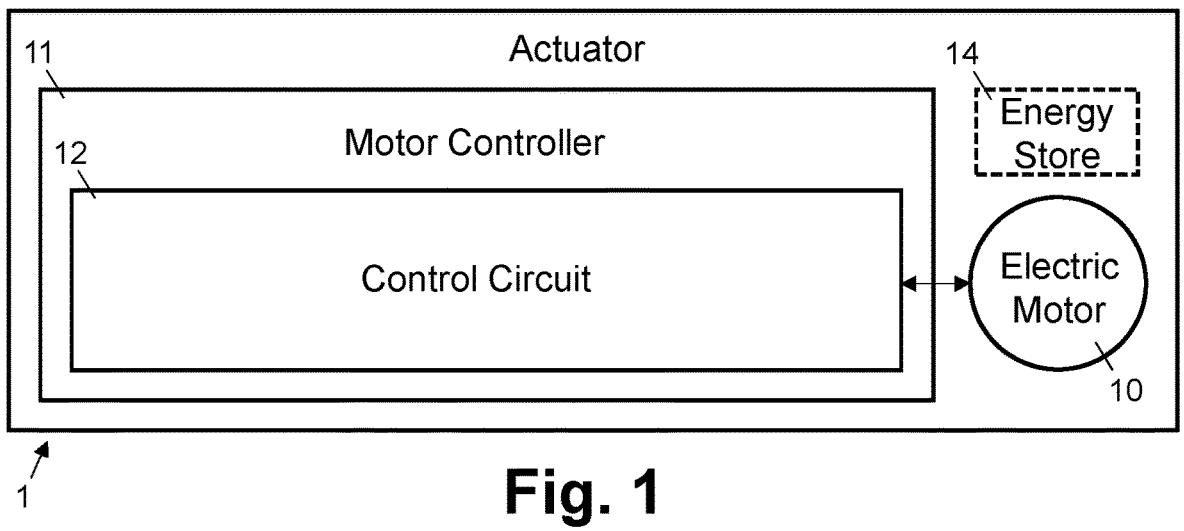
FIG. 1: shows a block diagram illustrating schematically an actuator comprising an electric motor, a motor controller with a control circuit, and an energy store.
Figure 2:
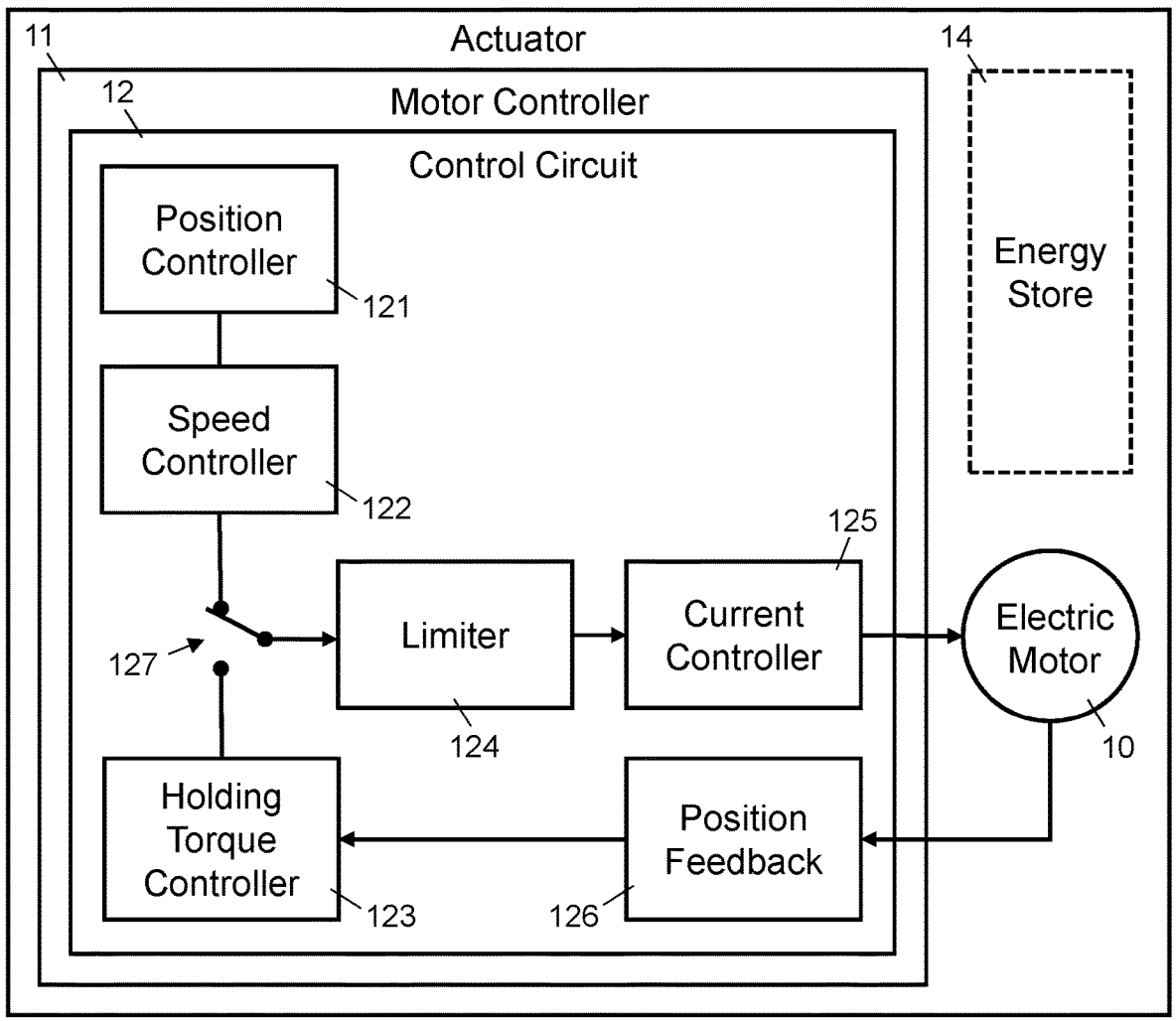
FIG. 2: shows a block diagram illustrating schematically an actuator comprising an electric motor, a motor controller with a control circuit, and an energy store, the control circuit comprising a holding torque controller.
Figure 3:
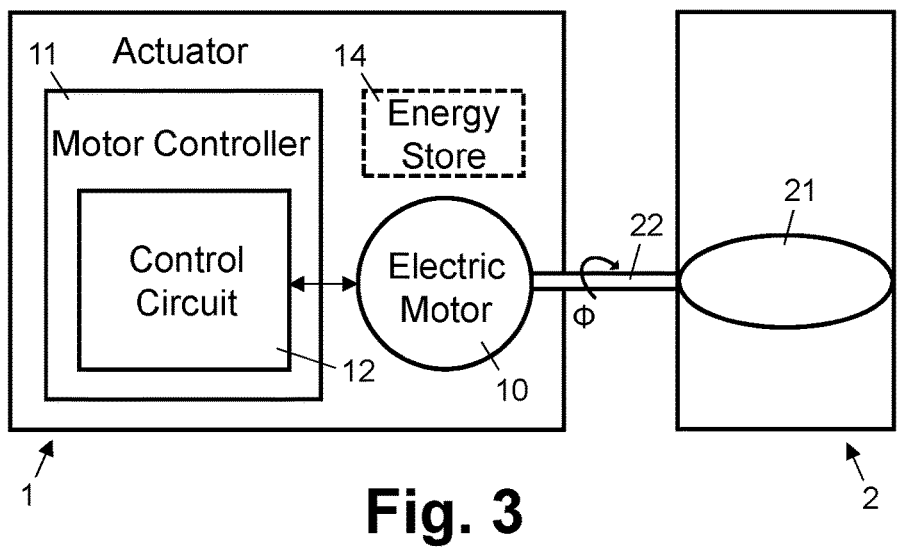
FIG. 3: shows a block diagram illustrating schematically an actuator comprising an electric motor, a motor controller with a control circuit, and an energy store, which actuator is mechanically coupled to a damper blade of a damper.

In FIGS. 1 to 3, reference numeral 1 refers to an actuator comprising an electric motor 10, specifically an electric motor 10 which has cogging torque, e.g. a brushless direct current motor, and a motor controller 11 comprising a control circuit 12. The actuator 1 is an HVAC actuator configured to drive an actuated part of an HVAC system to a target position, i.e. a set actuation position or actuated position within a range of actuatable positions, e.g. in a range from a fully closed to a fully open position, or from a defined minimum position to a defined maximum position. As illustrated in FIGS. 1 to 3, the actuator 1 further comprises an energy store 14, e.g. a battery or a capacitor, e.g. a supercapacitor (SC) such as a Lithium-ion capacitor (LIC). The energy store 14 is configured to power the electric motor 10, specifically in an emergency situation with power failure, such as to drive the electric motor 10 and an actuated part actuated by the electric motor 10 to a defined safety position. For example, in an emergency situation, the energy store 14 powers the electric motor 10 to drive a damper to a closed or fully open position, depending on the respective application and scenario. The control circuit 12 comprises a programmable processor, an application specific integrated circuit (ASIC), or another electronic circuit configured to control the electric motor 10. In the configuration involving a programmable processor, the actuator 1 further comprises or is connectable with a computer program product, which comprises a non-transient computer readable medium, having stored thereon programmed software modules with computer program code configured to control the processor, such that the processor controls the electric motor 10 to maintain a current motor position as described below in more detail.

As illustrated in FIG. 2, the control circuit 12 comprises various functional modules which are implemented as electronic sub-circuits or programmed software modules controlling a processor, respectively. The functional modules include a position controller 121, a speed controller 122, a holding torque controller 123, a limiter 124, a current controller 125, and a position feedback module 126. The position controller 121 is configured to control the electric motor 10 or motor current, respectively, to move to a set target position, defined by a number of motor rotations, or an angle or position of an actuated part. The speed controller 122 is configured to control the speed of the motor according to a set motor speed. The holding torque controller 123 is configured to control the motor current or torque, respectively, such as to maintain a current motor position, as explained below in more detail with reference to FIG. 5. The limiter 124 is configured to control the motor current within set limits of power, current, torque, and/or motor temperature. The current controller 125 is configured to control the motor current depending on control signals from the position controller 121, the speed controller 122, the holding torque controller 123, and/or the limiter 124. The position feedback module 126 is configured to determine and provide the current position of the electric motor 10 and/or its actuated part, respectively.

In FIG. 3, reference numeral 2 refers to a damper, specifically a damper for a Heating, Ventilating, and Air Conditioning (HVAC) system. As illustrated in FIG. 3, the damper comprises an actuated part 21, specifically a damper blade 21 for adjusting the orifice of the damper 2 and thereby the flow of fluid, e.g. air, through the damper 2. As further illustrated in FIG. 3, the actuated part 21, i.e. the damper blade 21, is mechanically coupled to the actuator 1 by way of a mechanical coupling 22, e.g. a drive shaft, for actuation by the actuator 1 or its electric motor 10, respectively. The actuator 10 or its motor 10, respectively, drives or moves the actuator part 21, i.e. the damper blade 21.

Figure 4:
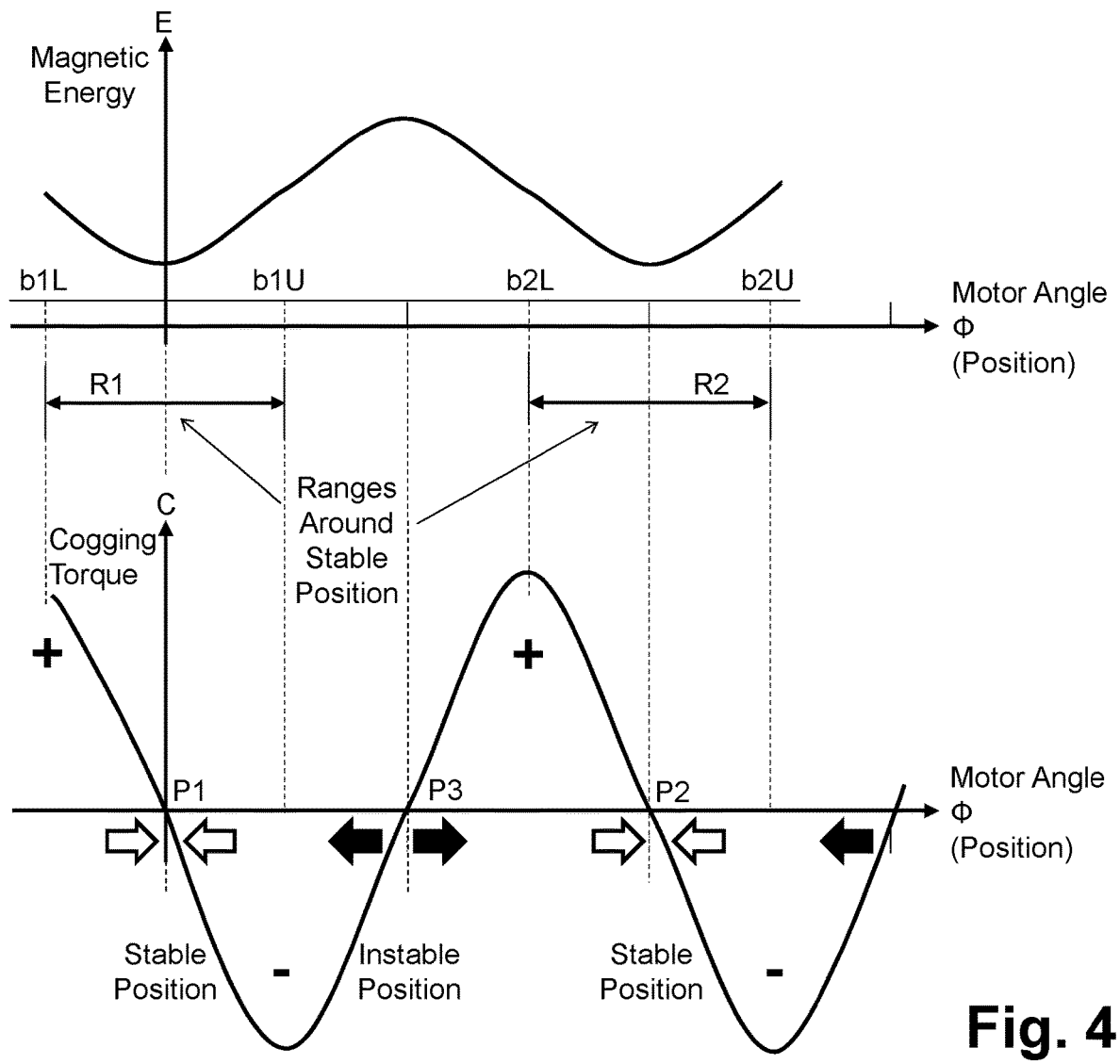
FIG. 4: shows graphs illustrating courses of magnetic energy and cogging torque of an electric motor depending on motor position or angle, respectively.

FIG. 4 shows in the upper graph the course of the magnetic energy E of the electric motor 10, as a function of or depending on the motor angle Φ (or the motor position, respectively). The lower graph of FIG. 4 shows the course of the cogging torque C of the electric motor 10, as a function of or depending on the motor angle Φ (or the motor position, respectively). As indicated in FIG. 4, the position or angle Φ of the electric motor 10 has stable positions P1, P2 and (stable) ranges R1, R2 around these stable positions P1, P2 where positive (+) cogging torque C and negative (−) cogging torque C draws the electric motor 10 towards the stable positions P1, P2; whereas in (instable) ranges around instable positions P3 positive (+) cogging torque C and negative (−) cogging torque C pulls the electric motor 10 away from the instable positions P3.

Figure 5:
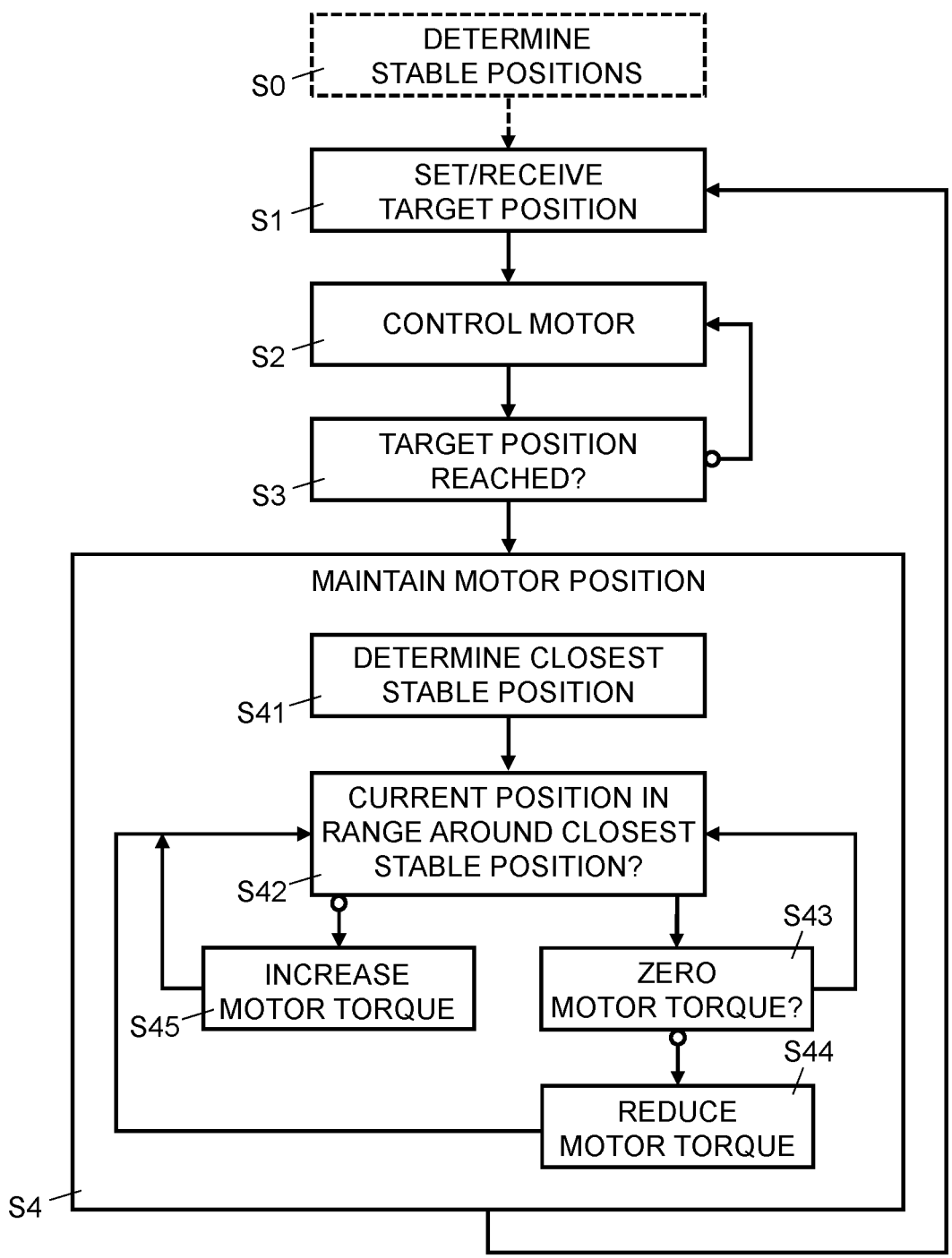
FIG. 5: shows a flow diagram illustrating an exemplary sequence of steps for controlling and holding the motor position of an electric motor.

As illustrated in FIG. 5, in preparatory step S0, the motor controller 11 or its circuit 12, respectively determines the stable positions P1, P2 of the electric motor 10 (position or angle ED). Furthermore, the motor controller 11 or its circuit 12, respectively determines defined ranges R1, R2 around the stable positions P1, P2, e.g. as portion of the distance or difference d between two consecutive stable positions P1, P2, d=P2−P1, e.g. a range R of R=[P−25%·d; P+25%·4] around a stable position P. For example, in a motor configuration where stable positions P1, P2 occur every 20°, i.e. d=20°, the range R around a stable position P is defined by R=[(P−5°)<Φ; Φ>(P+5°)], e.g. around P1: R1=[−5°<Φ; Φ<5°], or around P2: R2=[15°<Φ; Φ<25°]. Specifically, the stable positions P1, P2 (and ranges R1, R2) are stored in a data store of the motor controller 11 or its circuit 12, respectively. Depending on the embodiment and/or configuration, the stable positions P1, P2 (and ranges R1, R2) are determined by performing a calculation, based on a known configuration of the magnetic poles of the stator and the rotor of the electric motor 10, specifically based on the number of magnetic poles on the stator (e.g. an internal stator with nine magnetic poles) and the number of magnetic poles on the rotor (e.g. an external rotor with six magnetic poles) of the electric motor 10, or by performing a measurement run of the electric motor 10. For example, the calculation is performed "off-line" for the particular type and (magnetic) configuration of the electric motor 10 and stored in the motor controller 11 at manufacturing time or a later point in time. In case of the measurement run, the circuit 12 of the motor controller 11 controls the electric motor 10 to move in incremental steps, e.g. a rotation of one degree or of a partial degree, and determines the motor torque required to maintain the motor position at the incremental steps. Subsequently, the set of stable positions are determined as those incremental steps which require the smallest motor torque to maintain the motor position.

In step S1, the motor controller 11 or its circuit 12, respectively, receives or sets a target position for the electric motor 10 or a target value that relates to a target position for the electric motor 10. Depending on the application and/or installation, the target position or target value is defined and set by a building control system or a user terminal communicatively connected to the electric motor 10.

In step S2, the motor controller 11 or its circuit 12, respectively, controls the electric motor 10 to move to the set target position, e.g. to perform a certain number of rotations corresponding to a set rotary position (angle) or for driving an actuated part to a set (actuated) position. As illustrated schematically in FIG. 2, the motor controller 11 uses the position controller 121, the speed controller 122, the limiter 124, and the current controller 125 to control the electric motor 10 to reach the target position.

In step S3, the motor controller 11 or its circuit 12, respectively, determines whether the electric motor 10 or the actuated part, respectively, has reached the target position. Specifically, the position feedback module 126 determines and indicates the current position of the electric motor and/or the actuated part driven by the electric motor 10. If the target position has not been reached yet, control of the electric motor 10 is continued in step S2; otherwise, if the target position has been reached, a process of maintaining the current motor position is activated. For example, for that purpose, the position feedback module 126 or the circuit 12 or motor controller 11, respectively, activates the holding control torque controller 123.

In step S4, the holding control torque controller 123 or the circuit 12 or motor controller 11, respectively, controls the electric motor 10 to maintain its position at the current position or target position, respectively, as described below in more detail with reference to sub-steps S41, S42, S43, S44, and S45. One skilled in the art will understand that external forces and influences, such as a wind gust on a damper blade 21 of an external air damper 2 or a pressure change inside a fluid duct, will have an impact on the motor position and will have to be compensated by adapting the motor torque or motor current, respectively, to hold against the external force or influence, such as to maintain a target position.

In step S41, the holding control torque controller 123 or the circuit 12 or motor controller 11, respectively, determines the stable position closest to the target position or current position of the electric motor 10.

In step S42, the holding control torque controller 123 or the circuit 12 or motor controller 11, respectively, checks whether the current position of the electric motor 10 is within the range R1, R2 around the stable position P1, P2 determined in step S41. If the current position is within the respective range R1, R2, the process proceeds in step S43; otherwise, if the current position is outside the respective range R1, R2, processing proceeds in step S45 by increasing the motor torque or motor current, respectively.

In step S43, the holding control torque controller 123 or the circuit 12 or motor controller 11, respectively, checks whether the current motor torque or the motor current, respectively, is at zero, i.e. whether the electric motor 10 maintains its current position without requiring any motor current and, thus, not producing motor torque. If the current motor torque or the motor current, respectively, is at zero, the torque is maintained at zero and the processing continues in step S42. Otherwise, if the current motor torque or the motor current, respectively, is not at zero, processing continues in step S44 by reducing the motor torque or motor current, respectively.

In step S44, the holding control torque controller 123 or the circuit 12 or motor controller 11, respectively, reduces the motor torque or the motor current, respectively, e.g. by a predetermined amount or portion.

In an embodiment, the holding control torque controller 123 or the circuit 12 or motor controller 11, respectively, determines the duration, e.g. in terms of time or number of cycles, during which the motor torque or the motor current, respectively, is not at zero. If this "non-zero torque duration" is longer than a defined threshold, e.g. one minute, five minutes or an hour, processing continues in step S0 by determining an alternative stable position. For example, the alternative stable position is the stable position that is located preceding (before) or succeeding (following) the current stable position (previously selected in step S0). This approach makes it possible to find more advantageous stable positions which require less motor torque or motor current, respectively, through "trial and error".

In step S45, the holding control torque controller 123 or the circuit 12 or motor controller 11, respectively, increases the motor torque or motor current, respectively, e.g. by a predetermined amount or portion, and proceeds in step S42.

In an embodiment, in step S45, the holding control torque controller 123 or the circuit 12 or motor controller 11, respectively, further determines and stores the motor torque present at the point where the motor position has reached an upper or lower boundary b1L, MU, b2L, b2U of the defined range R1, R2 around the selected stable position P1, P2. Subsequently, when the motor torque or motor current, respectively, is reduced in step S44, it is not reduced beyond said recorded motor torque, which is thus used as a limit for reducing the motor torque.

It should be noted that, in the description, the computer program code has been associated with specific functional modules and the sequence of the steps has been presented in a specific order, one skilled in the art will understand, however, that the computer program code may be structured differently and that the order of at least some of the steps could be altered, without deviating from the scope of the invention.

The invention claimed is:

1. An actuator comprising:
an electric motor having cogging torque, and
a controller configured to control operation of the electric motor and determine a motor position of the electric motor,
wherein the controller comprises a circuit configured to:
control the electric motor to drive an actuated part of a Heating, Ventilating, and Air Conditioning system to a target position, and
maintain a current motor position by determining, from a set of stable positions that are defined by the cogging torque, a selected stable position closest to the current motor position, and controlling a motor torque of the electric motor to maintain the motor position within a defined range around the selected stable position.

2. The actuator of claim 1, wherein the circuit is configured to reduce the motor torque as long as the current motor position is within the defined range around the selected stable position.

3. The actuator of claim 2, wherein the circuit is configured to keep the motor torque at zero when the motor torque has been reduced to zero and the current motor position is within the defined range around the selected stable position.

4. The actuator of claim 1, wherein the circuit is configured to increase the motor torque to return the motor position within the defined range around the selected stable position when the current motor position has been moved outside the defined range around the selected stable position.

5. The actuator of claim 1, wherein the circuit is configured to record a value of the motor torque when the current motor position has reached a boundary of the defined range around the selected stable position, to increase the motor torque to return the motor position within the defined range around the selected stable position, and to reduce the motor torque as long as the current motor position is within the defined range around the selected stable position, using the recorded value of the motor torque for determining a limit of reducing the motor torque.

6. The actuator of claim 1, wherein the circuit is configured to determine the set of stable positions by controlling the electric motor to move in incremental steps, determining the motor torque to maintain the motor position at the incremental steps, and determining the set of stable positions from the incremental steps requiring the smallest motor torque to maintain the motor position.

7. The actuator of claim 1, wherein the actuator further comprises an electrical energy store configured to drive the electric motor to a defined safety position in case of a power failure.

8. The actuator of claim 1, wherein the electric motor is a brushless direct current motor.

9. A damper for a Heating, Ventilating, and Air Conditioning system comprising a damper blade and an actuator according to claim 1, coupled to the damper blade for moving the damper blade.

10. A method of controlling an electric motor to drive an actuated part of a Heating, Ventilating, and Air Conditioning system to a target position and maintain a current motor position, the method comprising:
determining, by a controller, the current motor position of the electric motor,
determining, by the controller, from a set of stable positions, defined by cogging torque of the electric motor, a selected stable position closest to the current motor position, and
controlling, by the controller, a motor torque of the electric motor to maintain the motor position within a defined range around the selected stable position.

11. The method of claim 10, further comprising reducing, by the controller, the motor torque as long as the current motor position is within the defined range around the selected stable position.

12. The method of claim 11, further comprising keeping, by the controller, the motor torque at zero when the motor torque has been reduced to zero and the current motor position is within the defined range around the selected stable position.

13. The method of claim 10, further comprising increasing, by the controller, the motor torque to return the motor position within the defined range around the selected stable position when the current motor position has been moved outside the defined range around the selected stable position.

14. The method of claim 10, further comprising recording, by the controller, a value of the motor torque when the current motor position has reached a boundary of the defined range around the selected stable position, increasing, by the controller, the motor torque to return the motor position within the defined range around the selected stable position, and reducing, by the controller, the motor torque as long as the current motor position is within the defined range around the selected stable position, using the recorded value of the motor torque for determining a limit of reducing the motor torque.

15. The method of claim 10, further comprising determining, by the controller, the set of stable positions by controlling the electric motor to move in incremental steps, determining the motor torque to maintain the motor position at the incremental steps, and determining the set of stable positions from the incremental steps requiring the smallest motor torque to maintain the motor position.

16. A non-transitory computer readable medium storing computer program code which, when executed by a processor of an actuator, causes the processor to control an electric motor of the actuator to drive an actuated part of a Heating, Ventilating, and Air Conditioning system to a target position and maintain a current motor position, by:

determining the current motor position of the electric motor, determining from a set of stable positions, defined by cogging torque of the electric motor, a selected stable position closest to the current motor position, and controlling a motor torque of the electric motor to maintain the motor position within a defined range around the selected stable position.

* * * * *